G. C. BAUMAN.
CARD CUTTING MACHINE.
APPLICATION FILED FEB. 27, 1911.
1,053,966.
Patented Feb. 25, 1913.
9 SHEETS—SHEET 1.
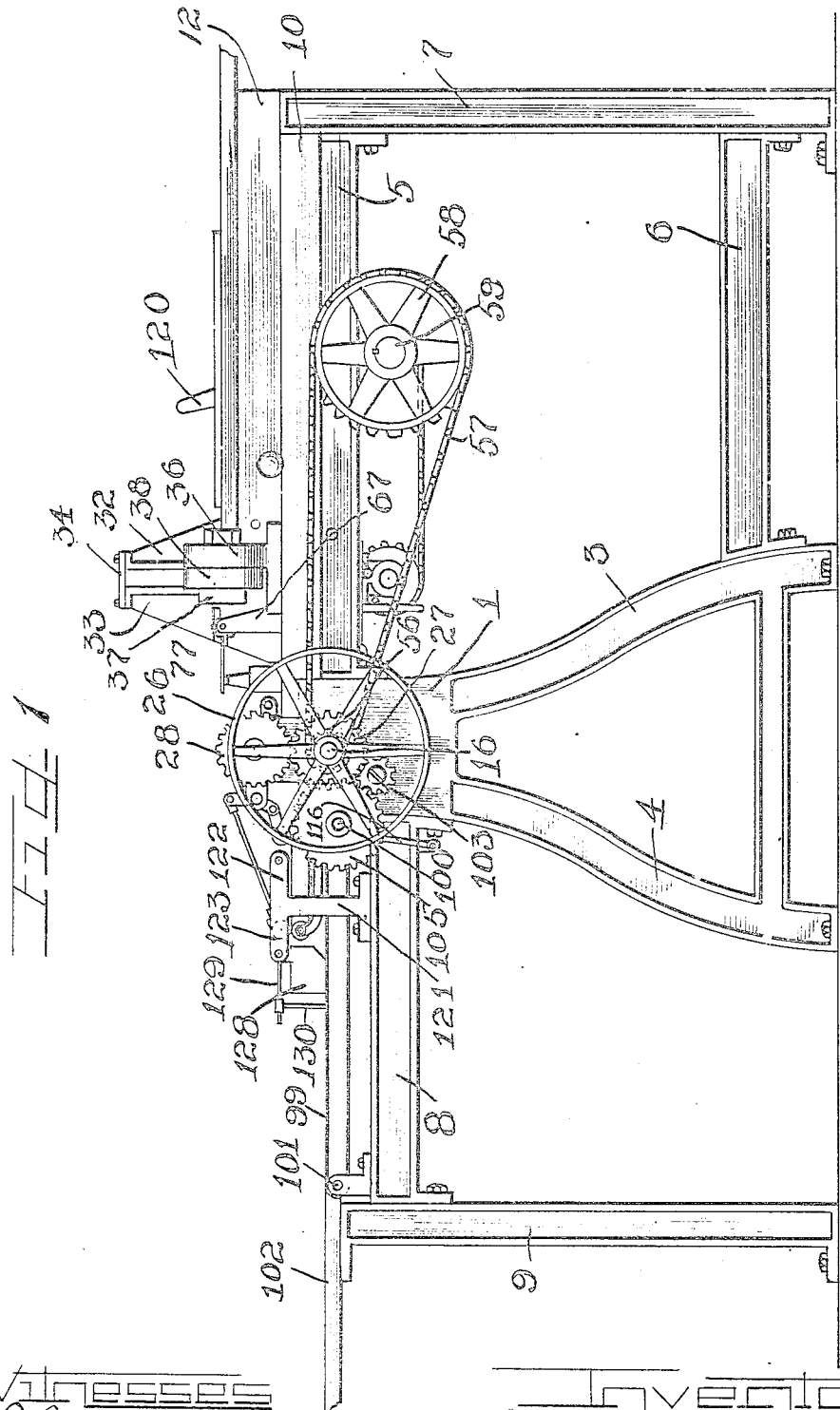

G. C. BAUMAN.
CARD CUTTING MACHINE.
APPLICATION FILED FEB. 27, 1911.
1,053,966.
Patented Feb. 25, 1913.
9 SHEETS—SHEET 2.
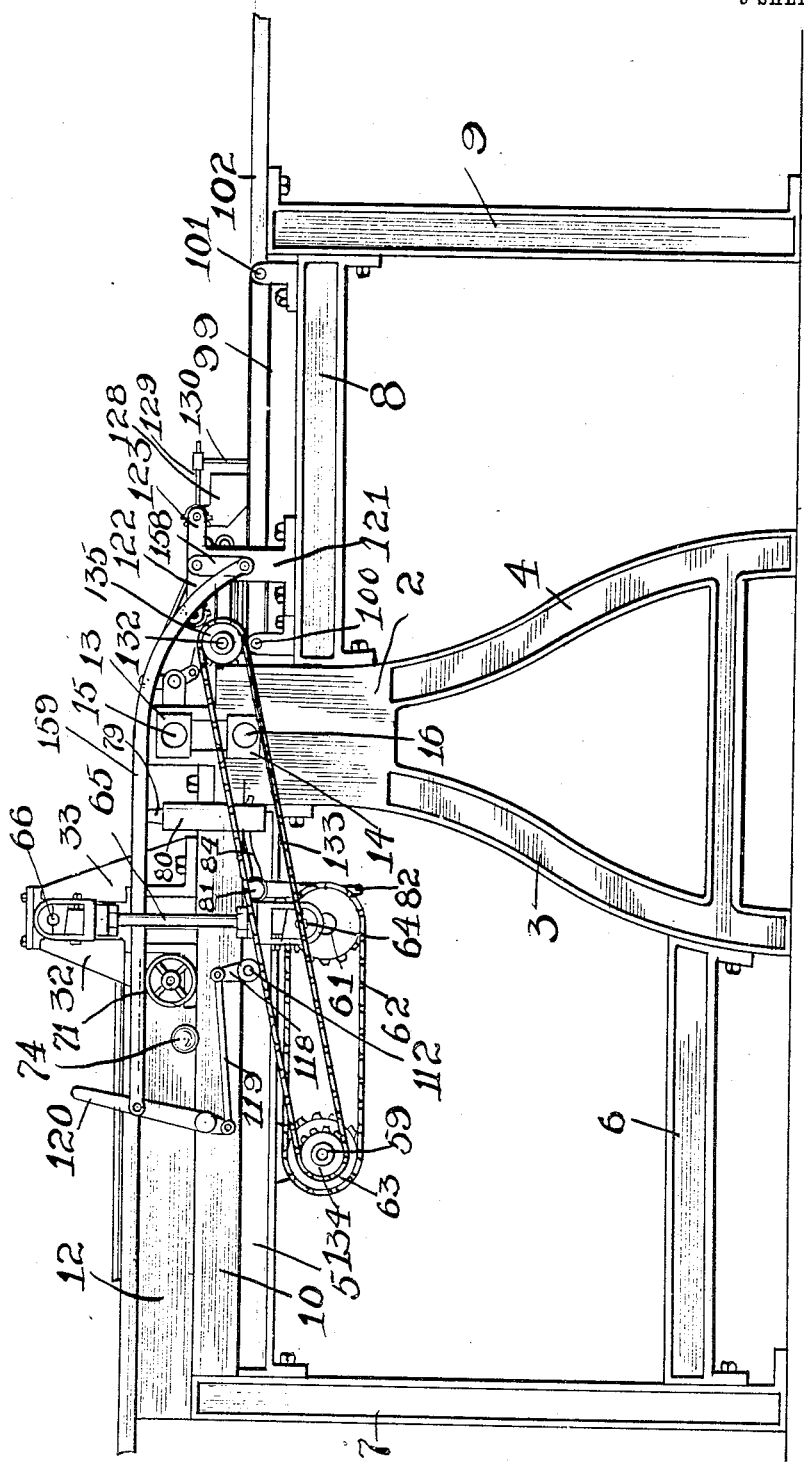

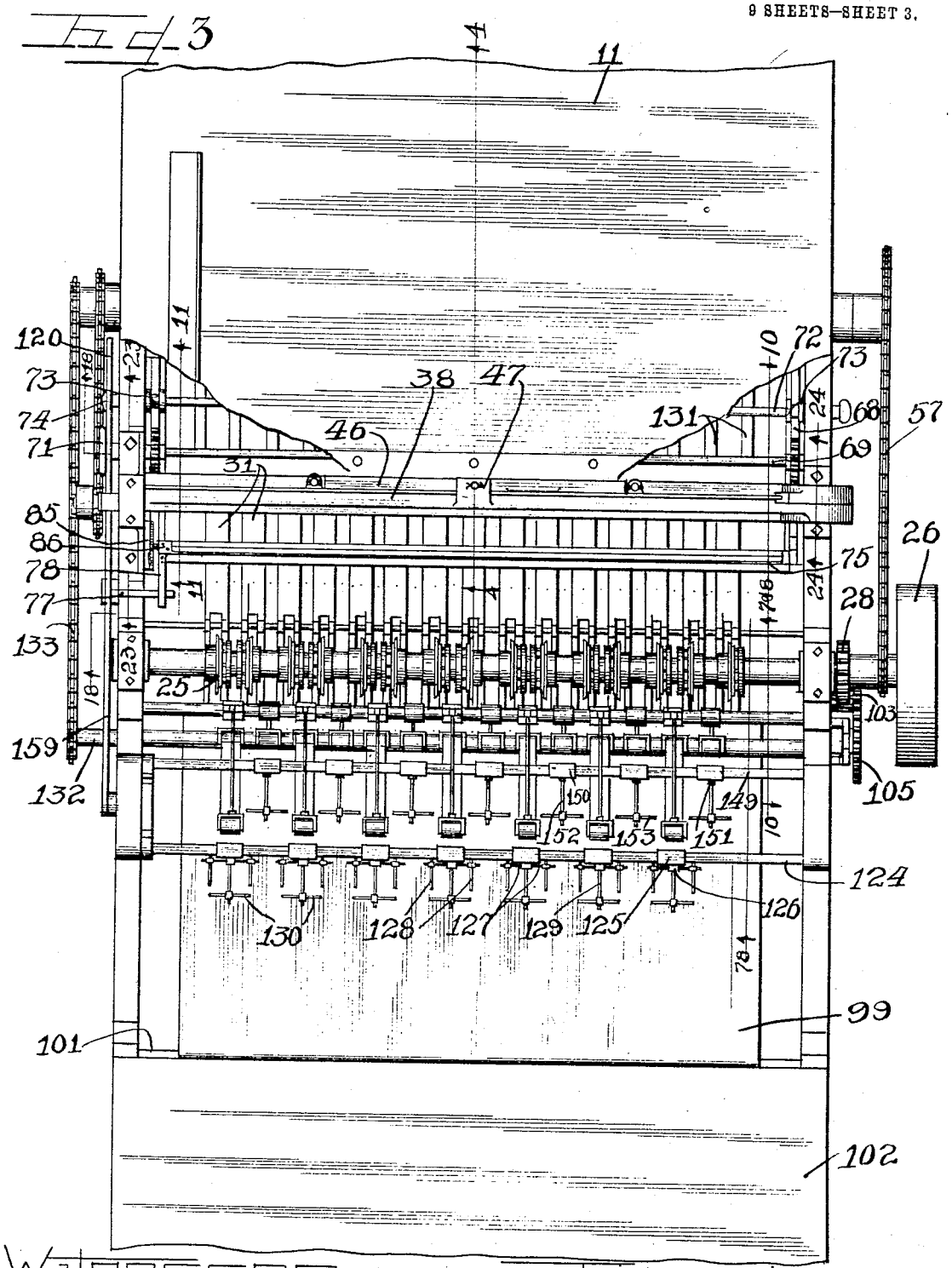

G. C. BAUMAN.
CARD CUTTING MACHINE.
APPLICATION FILED FEB. 27, 1911.
1,053,966.
Patented Feb. 25, 1913.
9 SHEETS—SHEET 4.
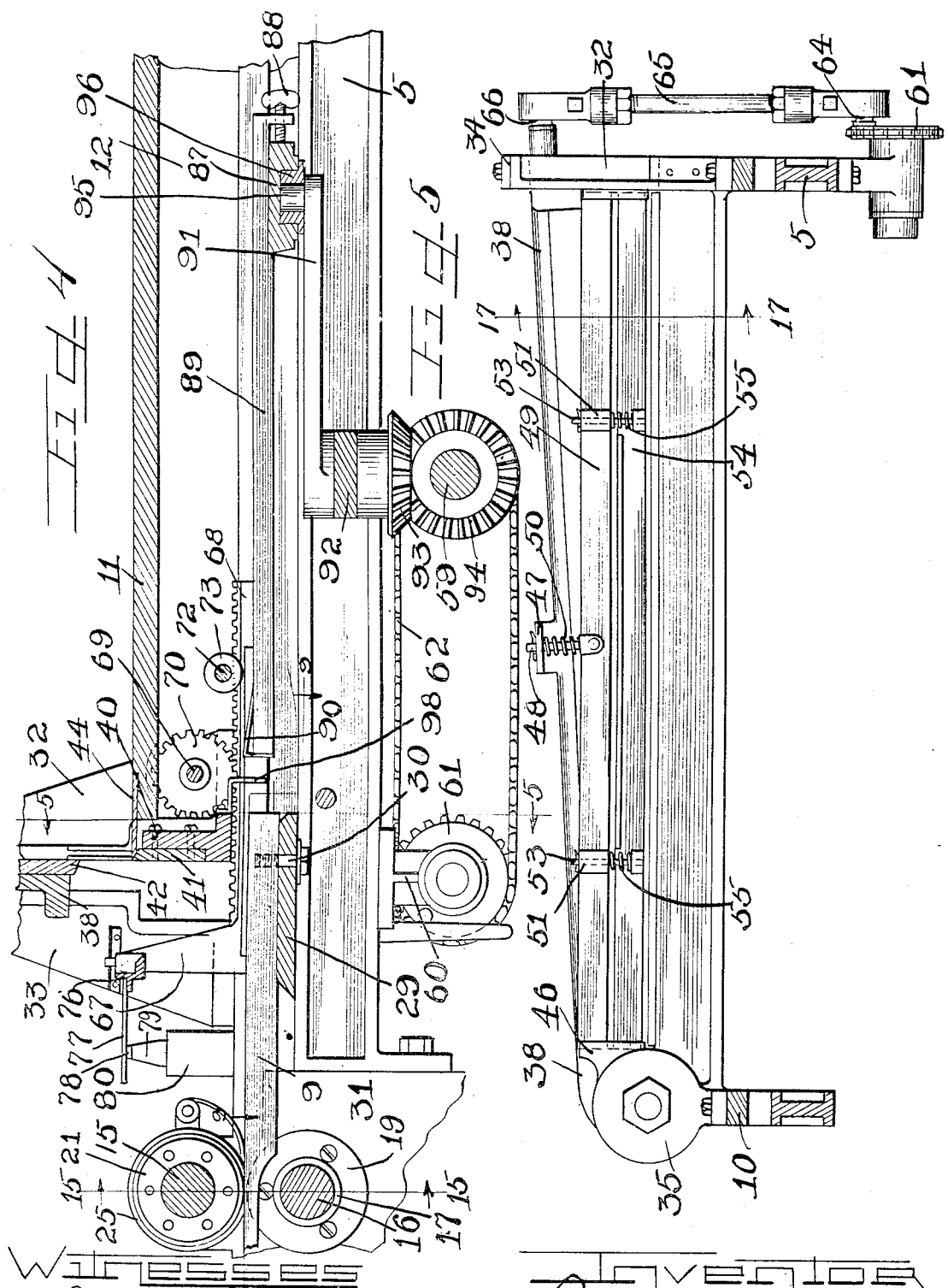

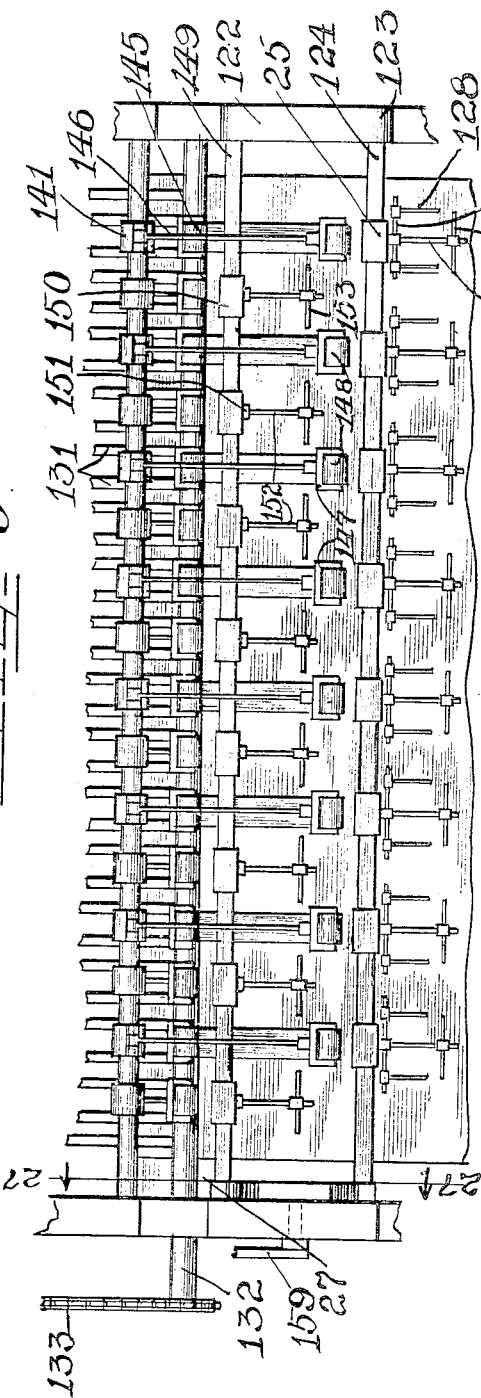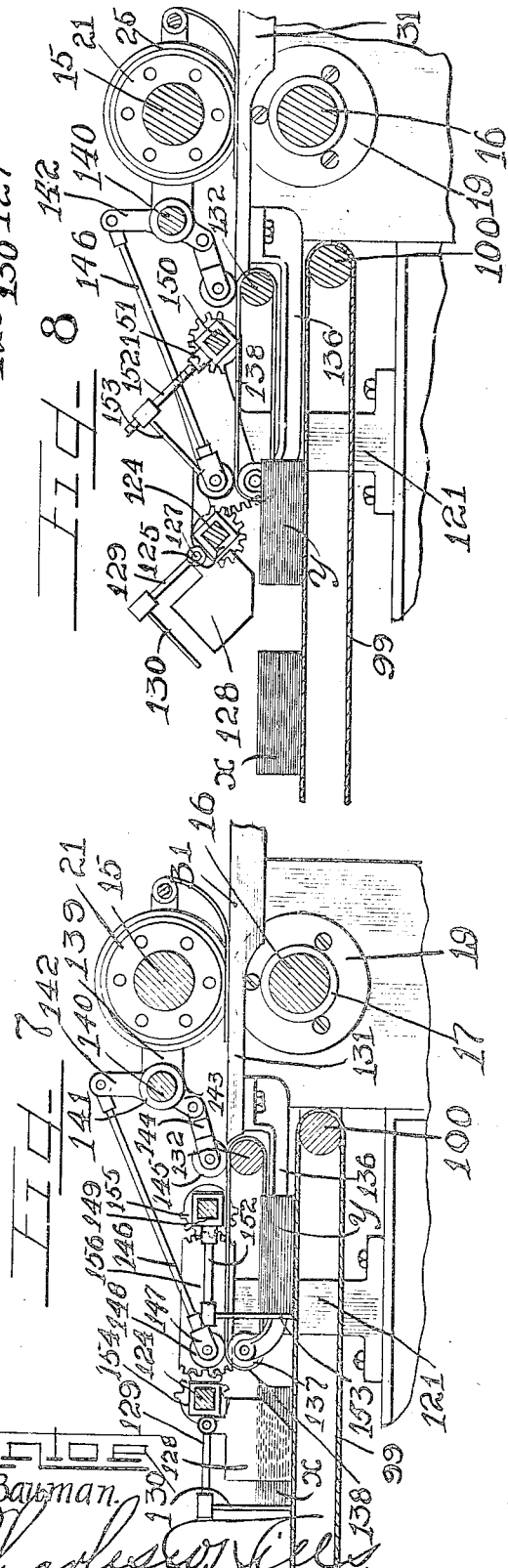

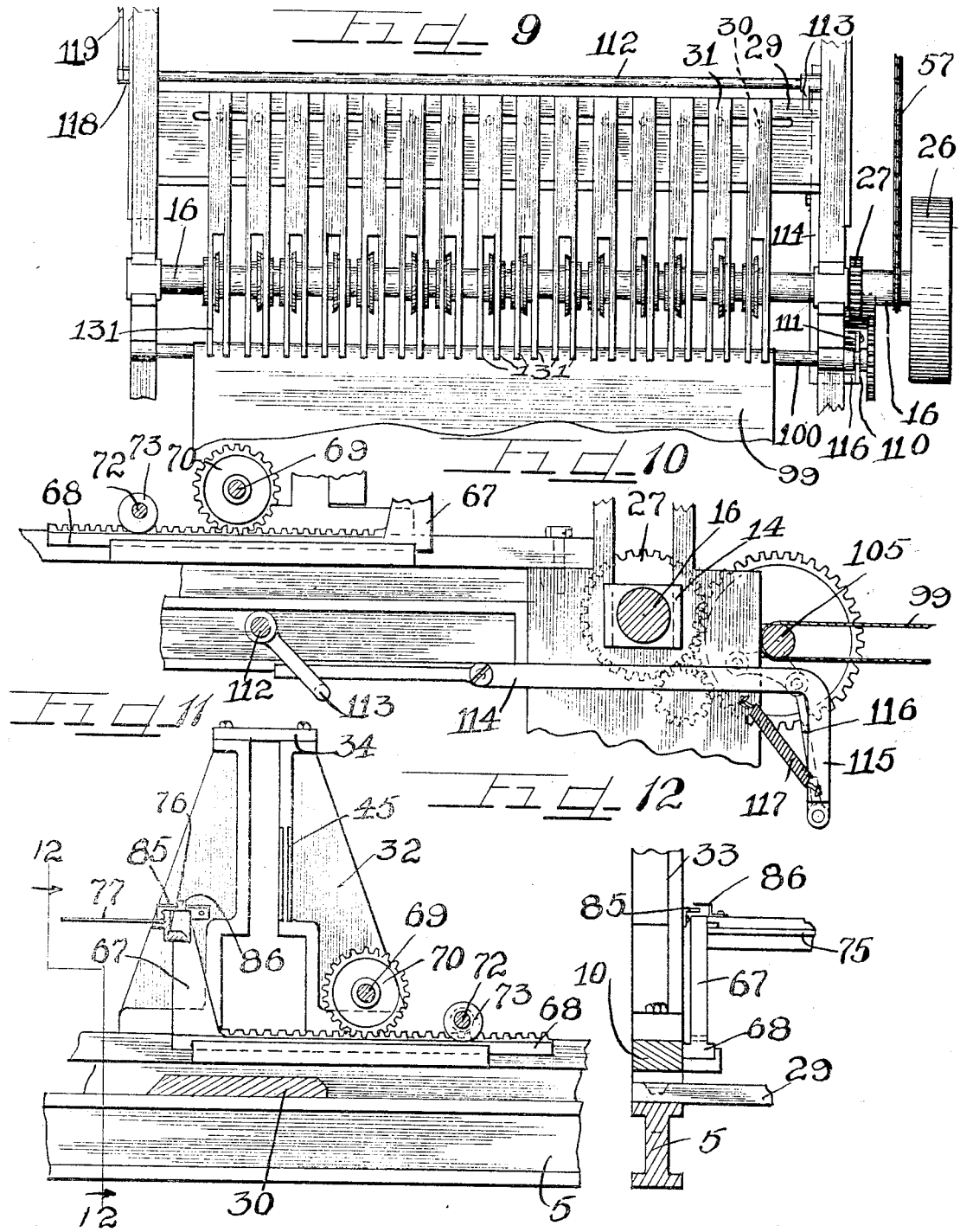

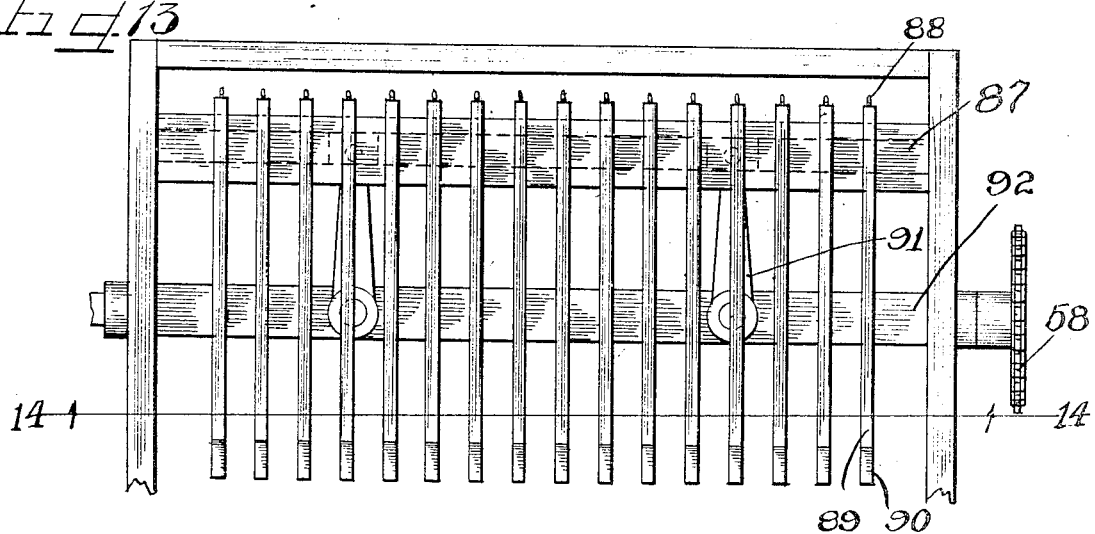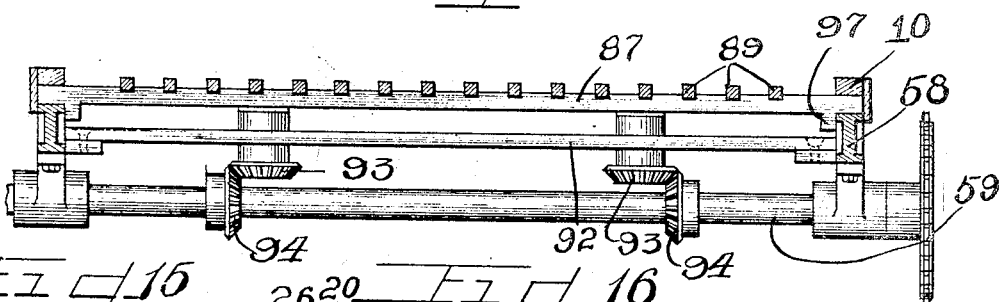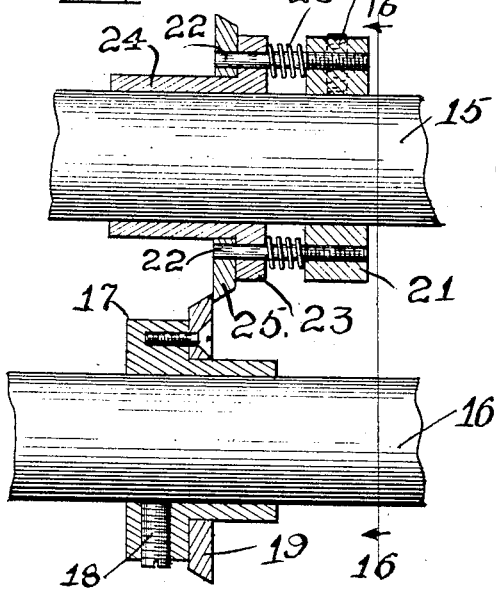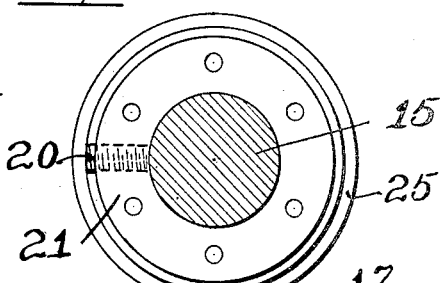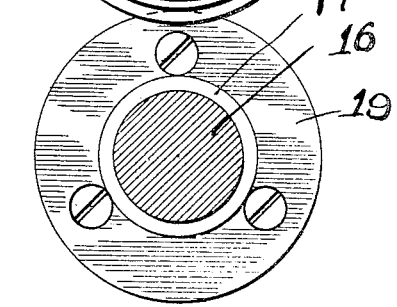

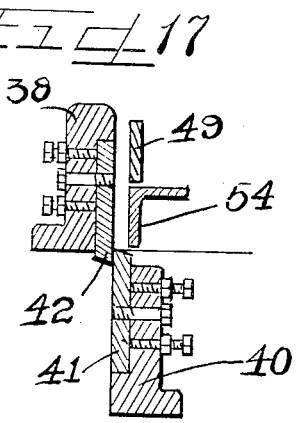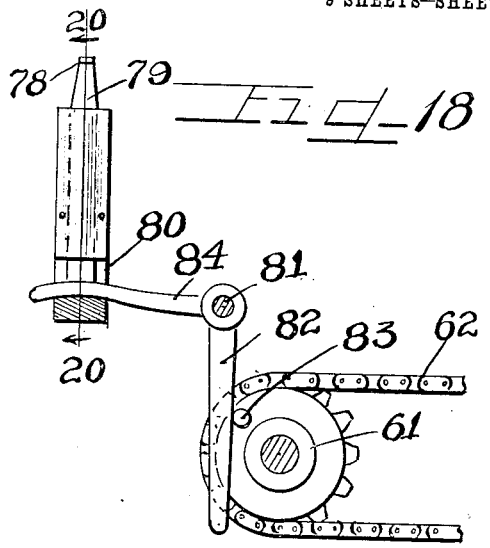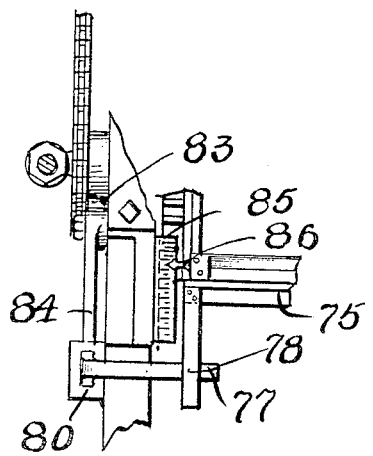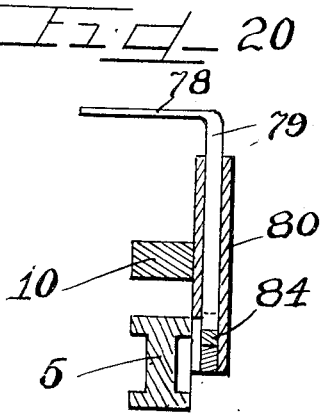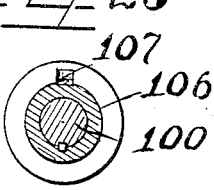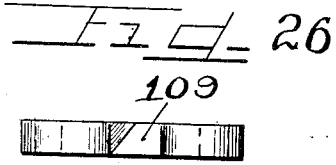

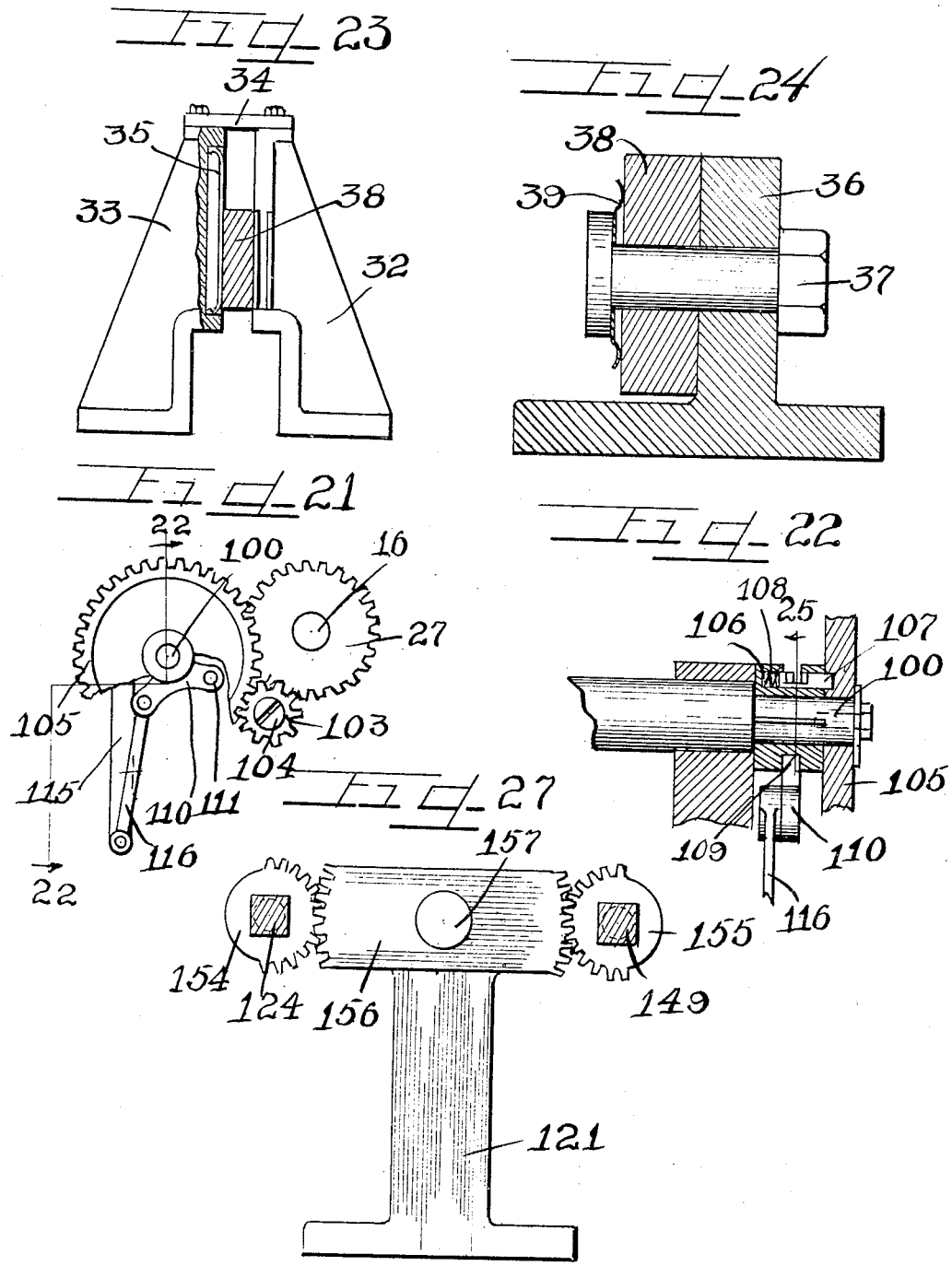

UNITED STATES PATENT OFFICE.

GEORGE C. BAUMAN, OF CHICAGO, ILLINOIS, ASSIGNOR TO MOSER PAPER COMPANY, OF CHICAGO, ILLINOIS, A CORPORATION OF ILLINOIS.

CARD-CUTTING MACHINE.

1,053,966.   Specification of Letters Patent.   Patented Feb. 25, 1913.

Application filed February 27, 1911. Serial No. 611,244.

*To all whom it may concern:*

Be it known that I, GEORGE C. BAUMAN, a citizen of the United States, and a resident of the city of Chicago, in the county of Cook and State of Illinois, have invented certain new and useful Improvements in Card-Cutting Machines; and I do hereby declare that the following is a full, clear, and exact description of the same, reference being had to the accompanying drawings, and to the numbers of reference marked thereon, which form a part of this specification.

This invention relates more particularly to a machine for cutting square cornered cards by means other than a reciprocating die.

The object of this invention is to afford a machine adapted to cut a plurality of cards simultaneously from a sheet fed thereinto and to assemble the cut cards into groups or packages of a predetermined number.

It is a further object of the invention to afford a machine to which the cardboard may be fed into the machine in standard sheets by an operator and by means of which a plurality of cards may be cut simultaneously for the width of the sheet and without waste.

The invention also includes as an object the reciprocating cutter for cutting the cards as to one dimension and a plurality of rotating and coacting cutters between which the card strip is passed to cut the same as to the other dimension.

It also includes as the object, assembling mechanisms whereby the cards as cut by each group of cutters, are assembled in packages ready for wrapping and packing.

The invention embraces many novel features and consists in the matters hereinafter described and more fully pointed out and defined in the appended claims.

In the drawings: Figure 1 is a view in elevation of the driving side of the machine. Fig. 2 is a similar view in elevation of the opposite side of the machine. Fig. 3 is an enlarged fragmentary top plan view of the machine with parts broken away. Fig. 4 is an enlarged section on line 4—4 of Fig. 3. Fig. 5 is a section on line 5—5 of Fig. 4, showing the knife and clamping means in elevation. Fig. 6 is an enlarged fragmentary detail plan view. Figs. 7 and 8 are enlarged sections, illustrating the operation of the cutting and assembling mechanisms. Fig. 9 is a section on line 9—9 of Fig. 4. Fig. 10 is an enlarged section on line 10—10 of Fig. 3. Fig. 11 is an enlarged section on line 11—11 of Fig. 3. Fig. 12 is a section taken on line 12—12 of Fig. 11. Fig. 13 is a plan view of the reciprocating gage for moving the card strip to the rotary cutters. Fig. 14 is a section on line 14—14 of Fig. 13. Fig. 15 is an enlarged sectional detail of a pair of rotary cutters taken on line 15—15 of Fig. 4. Fig. 16 is a section taken on line 16—16 of Fig. 15. Fig. 17 is a section taken on line 17—17 Fig. 5. Fig. 18 is a fragmentary sectional view with parts omitted taken on line 18—18 of Fig. 3. Fig. 19 is a fragmentary top plan view thereof. Fig. 20 is a section on line 20—20 of Fig. 18. Fig. 21 is an enlarged fragmentary detail of the drive for the apron feed. Fig. 22 is an enlarged section taken on line 22—22 of Fig. 21. Fig. 23 is an enlarged section on line 23—23 of Fig. 3. Fig. 24 is an enlarged section on line 24—24 of Fig. 3. Fig. 25 is a section on line 25—25 of Fig. 22. Fig. 26 is an enlarged top plan view of the clutch cam shown in Fig. 22. Fig. 27 is an enlarged section on line 27—27 of Fig. 6.

As shown in said drawings: The machine frame comprises a pair of central side frame members 1 and 2, which may conveniently be constructed of cast metal, and if so, each provided with legs 3 and 4, connected together and braced in any suitable manner to afford strength both longitudinally and transversely and in parallel relation. Rigidly connected with each of said central side members near the top thereof, are top horizontal frame members 5, and lower horizontal frame members 6, which are rigidly bolted thereto and to which is rigidly secured by bolting or otherwise, end legs 7. Rigidly secured on the other side of said central frame and somewhat below the horizontal side frame members 5, are horizontal side frame members 8, which are also rigidly connected at their outer ends on legs 9, as shown in Figs. 1 and 2. The side frame members so constructed are connected by transverse frame members in any suitable manner. Secured on the beams on the side frame members 5, and affording upward extensions thereof, (and, if preferred, integrally connected therewith) are parallel frame members 10, which are connected with the legs 9, and with the central frame member as before described, and mounted thereon is a feed table 11, the sides 12, of which rest upon, and are secured upon said side frame members. Said central frame members 1 and 2, are provided at the center with a bearing slot or recess, extending downwardly therein and in which are upper and lower boxes 13 and 14, in which are journaled shafts 15 and 16, for the cutting rolls, and adjustably secured on said shafts 15 and 16, are coacting rotative cutters. For this purpose, as shown, a collar 17, is rigidly secured on the lower shaft by means of a set screw 18, and secured on the face of said collar is an annular cutting knife 19.

Adjustably secured on the upper shaft 15, as shown by means of a set screw 20, is a collar 21. Threaded in said collar 21, and projecting parallel the shaft and toward the cutter 19, are pins 22, which extend through a flange 23, in a collar 24, slidable on said shaft, and slidably secured on the outer ends of said pins is an annular knife 25, which is yieldingly held at all times in position to coact with the lower knife 19, by means of pushing springs 26, secured on said pins between the collar 21, and the flange 23, of the collar 24, as shown in Fig. 15. These cutters are arranged in the length of the shafts 15 and 16, in pairs a distance apart equal to the width it is desired to cut the cards, and any desired number of such pairs of cutters may be employed on said shafts dependent upon the width of the cardboard to be used.

As shown, the shaft 16, is driven continuously by means of a belt wheel or pulley 26, secured on the outer end thereof, as shown in Fig. 1, and equal intermeshing gears 27 and 28, are provided on said shaft to communicate the drive from the lower to the upper.

Secured on the inner side of the frame bars or beams 5, in advance of the cutter shafts 15 and 16, is a flat transverse frame member or bar 29, as shown in Figs. 4 and 9. Said bar is relatively broad and is longitudinally slotted, as shown in Fig. 9, to receive therethrough adjusting bolts 30, whereby longitudinal carrying bars 31, are adjustably secured on said bar 29, and extend rearwardly and are longitudinally slotted at their rear ends to provide each a finger extending on each side of one of the pairs of cutters to support the material while passing therethrough. Mounted on said frame on each side thereof, and in advance of the cutting rolls, are upwardly directed brackets 32, and 33, having on their inner sides vertical parallel faces affording a guide slot therebetween. Said brackets are rigidly connected at their top by means of a plate 34, rigidly bolted thereto, and are rigidly secured upon the frame by means of suitable bolts, as shown in Fig. 2, and the inner face of the bracket 33, is recessed, as shown in Fig. 23, to receive therein a strong leaf spring 35.

Rigidly secured on the side frame bar 10, on the driving side of the machine, is an upwardly directed knuckle 36, through which extends a pivot bolt 37, on which is pivotally engaged one end of the cutter bar 38, which extends transversely the machine, and the end of which on the opposite side of the machine, is slidably engaged between the brackets 32 and 33, the rear side of said bar bearing at all times against the leaf spring 35, recessed in the bracket 33, to afford a yielding engagement in the guides afforded by said brackets. As shown also, a spring 39, is engaged on the rearwardly directed head of the bolt 37, as indicated in Fig. 24, to permit said knife bar to yield slightly toward the rear of the machine when in operation.

Secured transversely the frame substantially in alinement with the inner face of the bracket 32, and the knuckle 36, is a lower knife bar 40, on which a knife 41, is rigidly secured with the rear face thereof flush with the rear bearing faces of the bracket 32, and knuckle 36, as shown in Fig. 4, to coact with the knife 42, removably secured on the knife bar 38, as shown in Figs. 4 and 17. Mounted on said frame with its top approximately on a level with the upper edge of the fixed knife 41, is a table 11, and set flush in the face thereof and projecting to near the cutting edge of said fixed knife, is a plate 44. As shown, a vertical guide groove 45, is provided on the inner side of the bracket 32, parallel with the extension 46, on the knuckle 35, as shown in Fig. 5. The knife bar 38, is provided at its center and on the forward side thereof, with an upwardly and forwardly extending flange 47, through which extends a pivot bolt 48, which depends therefrom on the side adjacent the feed table and on the lower end of which is pivotally engaged an equalizing bar 49, the ends of which engage in the guides afforded between said bracket 32, and the lug 35, on opposite sides of the machine, as shown in Fig. 5. A strong pushing spring 50, is provided on said pivot bolt 48, to hold said equalizing bar normally at the downward limit of the knife bar. Said equalizing bar is provided at each end with vertical apertured bosses 51, through which slidably extend bolts 53, the lower ends of which are engaged on a presser bar 54. As shown, the presser bar and equalizing bar are both slidable in the guide grooves before described, and a strong pushing spring 55, is secured on each of said bolts 53, and acts to hold the presser bar at the lower limit of its movement at all times.

The presser bar is yieldingly supported at such a height above the table, that with each downward movement of the cutter or knife bar 38, said presser bar engages the cardboard during the cutting operation to firmly hold the same until the retraction of the knife, and, owing to the mounting of the presser bar as before described, said presser bar at all times maintains a parallel relation with the plane of the feed table. Said knife bar 38, is reciprocated as follows: A sprocket wheel 56, is provided on the main shaft 16, and a sprocket chain 57, trained around the same is also trained around the sprocket wheel 58, secured on a shaft 59, which extends transversely the table, and is journaled below the frame bars 5. A bracket 60, is rigidly secured on the frame bar 5, on the opposite side of the machine from the driving pulley, and journaled thereon is a sprocket wheel 61, driven by means of a sprocket chain 62, trained about a sprocket wheel 63, secured on said shaft 59, on the opposite end thereof from the driving sprocket wheel 58, secured thereto. A wrist pin 64, is provided in the outer face of said sprocket wheel 61, and a connecting rod 65, is engaged at one end of said wrist pin 64, and at its upper end engages a suitable extension 66, on the knife bar beyond the guide brackets 32 and 33, as shown in Fig. 5, so that the rotation of said sprocket wheel acts to continuously reciprocate said knife bar to sever the cardboard fed therebeneath.

Slidably and adjustably mounted on the top frame bar 10, at each side thereof and at the rear of the reciprocating knife is a standard 67, integrally connected with each of which is a forwardly extending, upwardly directed rack bar 68, seated to slide in a suitable groove therefor in the top of said side frame member. Journaled transversely the machine in any suitable manner is a shaft 69, provided at each end with a spur gear 70, which meshes with the rack 68, on each side of the machine, as shown in Figs. 3 and 4, and a hand wheel 71, is provided on the outer end of the shaft to permit the same to be rotated to adjust said standards forwardly or rearwardly relatively the knives. A shaft 72, is suitably journaled on the frame extending transversely the same and provided with a cam 73, on each side of the frame positioned to engage and rigidly lock the rack bars 68, thereto when in adjusted position. For this purpose, as shown, a hand wheel 74, is provided on the outer end of said shaft 72, and adjacent the main wheel 71, to permit the cams 73 to be operated to release the racks for the adjustment of said standards and to rigidly engage the same to the frame when the standards are in suitably adjusted position. Extending transversely the machine and pivotally and eccentrically engaged between said standards to hang below the same, is a cutting gage to determine one of the dimensions of the cards to be cut, as, for instance, the length. This gage comprises a relatively heavy and substantially horizontal flange 75, directed toward, and but slightly below, the plane of the cutting table. An upwardly directed web 76, is integral with said flange 75, and extends the length of said gage, and affords the rear side thereof, the inner front face of said flange serving as a stop for said cardboard when fed inwardly beneath the knife, as shown in Figs. 4 and 11. Inasmuch as said gage bar is pivotally engaged at the heads of the brackets 67, the same is at all times supported by gravity, as shown in Figs. 4 and 11, to serve as a stop to the forward feed of the board from which the card strip is to be severed, and to support the card strip until completely severed from the sheet. Means are provided for actuating said gage to release the severed card strip simultaneously with the retraction of the cutting knife. For this purpose, a rod 77, is secured on said gage bar at one end thereof and extends rearwardly and is supported upon the inwardly directed horizontal end 78, of a vertically movable rod 79, in the vertical guide bearings 80, secured on the frame, and means are provided for actuating the same embracing a bell crank lever journaled on a stud 81, secured on the side frame of the machine, and one arm 82, of which extends downwardly between the inner side of the sprocket wheel 61, and frame, and positioned to be engaged and struck rearwardly by a pin 83, secured in the rear face of said sprocket wheel near the periphery thereof, as shown in Fig. 18. The other arm 84, of said bell crank extends beneath the lifting rod 79, as shown in Figs. 18 to 20 inclusive, so that with each revolution of the sprocket wheel 61, (which also actuates the knife bar) the gage is tilted rearwardly to drop the severed card strip onto the bars 31.

A scale 85, is provided on the inner face of the standard 33, to facilitate the adjustment of the card gage to vary the width of the card strip severed from the strip. For this purpose, as shown, a suitable graduated plate of metal is secured horizontally on said bracket indicator 86, and is secured on the gage bar, as shown in Figs. 11 and 19, so that adjustment of the gage from the cutting edge of the knife may be indicated thereby in fractions of an inch or any other suitable linear scale.

Means are provided for moving the severed card strip rearwardly to the rotative cutters and adjusting said strip to feed true thereto. For this purpose, as shown, a transverse bar 87, is slidably supported upon ways afforded by the tops of the side frame members 5, and rigidly and adjustably engaged thereto by means of set screws 88, are rearwardly projecting, parallel feed bars 89, spaced a distance apart to permit the same to pass between the bars 31, whereon the severed card strips fall. Said rods 89, are of less thickness than the bars 31, so that the upper faces thereof lie below the upper surfaces of said bars at all times, and, as shown, each of said rods 89, is provided at its rear end with an upwardly and forwardly inclined extension 90, adapted to project above the surface of the bars 31, to engage and slide the card strips rearwardly. Means are provided for reciprocating said feed bars rearwardly and forwardly to feed the strips to the rotative knives. For this purpose, as shown, crank arms 91, are journaled in a horizontal frame member 92, extending above the shaft 59. On the lower end of the journal extending through said bar 92, is secured a bevel pinion 93, which meshes with a complemental bevel pinion 94, on said shaft 59. The crank arms (two in number) are of a sufficient length to afford the necessary extent of reciprocation for said feed bars to push the card strip along the bars 31, to the rotative knives. Each of said crank arms is provided at its extremity with an upwardly directed stud or pin 95, and journaled on said stud or pin is a roller 96, which fits in a longitudinal slot in the slide bar 87, as shown in Fig. 4, and in dotted lines in Fig. 13, so that with the rotation of said cranks, the feed bars 89, are reciprocated simultaneously toward the rear to feed the card strip to the rotative cutters and forwardly to the position shown in Fig. 4, preliminary to feeding a succeeding strip to the cutters. Said reciprocating bar 87, as shown in Fig. 14, fits at its ends in the guide grooves provided in the frame therefor, and, as shown, is provided on its under side with a downwardly projecting flange 97, which, at each end of said bar, bears against the lateral frame member 5, to guide said bar true. As shown, the upward projection 90, at the extremity of each bar, inclines forwardly to permit said feed bars to be withdrawn from beneath the card strips falling from the knives before the retraction thereof, and suitably secured on the lower knife bar 40, are downwardly projecting fingers 98, which serve as stops for the card strip to prevent the same being drawn forwardly on the feed bars with the retraction thereof.

As ordinarily adjusted, the width of the card strip severed by the reciprocating knife is the length of the card to be cut, and the distance between the successive pairs of rotative cutters determines the width of the cards to be cut, and mechanism is provided for assembling the cards when cut, into packages of a predetermined number and for delivering the assembled packs from the machine. For this purpose a broad endless apron 99, of substantially the width of the maximum cutting capacity of the machine, is trained around a shaft 100, and a shaft 101, the former located in close proximity with the lower cutting shaft 16, and at the rear thereof and the latter at the rear end of the table and closely adjacent to which is provided a receiving table 102, afforded on the frame and the surface of which is flush with the top of said apron or carrier 99, and is in close proximity with said roller to receive the card packs from said apron. Said apron is driven from the main shaft 16, which carries the lower rotative cutters as follows:—A long pinion 103, is journaled on a suitable stud 104, secured on the frame and rotatably secured on the end of the shaft 100, is a gear 105, which at all times meshes with said pinion, as shown in Figs. 1, 3, 21 and 22. Keyed on said shaft is a peripherally grooved collar 106, having a sliding pin 107, therein, parallel the shaft and adapted to engage in a suitable recess or socket in the gear 105. A spring 108, is seated in a suitable recess in said collar to press said pin at all times outwardly, and a detent 109, integral with the link 110, pivotally supported upon the frame by means of a stud 111, as shown in Fig. 21, is normally supported to engage and hold said clutch pin 107, retracted from the gear 105, and means are provided for releasing the detent from said pin to permit the same to engage in said gear to drive said shaft and thereby the apron. For this purpose, a shaft 112, is journaled transversely the frame below the feed rods and on the end thereof at the driving side of the machine, is provided with a depending crank arm 113, having a laterally directed finger thereon indicated in dotted lines in Fig. 10. A lever 114, is pivotally engaged on the frame and one end thereof extends forwardly and over said finger on the crank arm 113, and the other end thereof extends rearwardly and then downwardly, affording an arm 115, with which is connected a connecting rod 116, the upper end of which is pivotally engaged on the end of the link 110, on the opposite side of the detent 112, for said link. A pulling spring 117, is engaged on said downwardly directed end 115, of said lever and on the frame and acts normally to hold said end of the lever elevated with the detent 109, positioned, as shown in Fig. 22, to retract the clutch pin 107, from the gear 105. On the opposite end of said shaft 112, that is to say, at the operating side of the machine, a crank arm 118, is rigidly secured, which is connected by means of a connecting rod 119, with the lower end of the operator's lever 120, as shown in Fig. 2. This arrangement is such that with the position of the operator's lever, as shown in Fig. 2, the lever 114, is out of engagement with the finger on the crank arm 113, so that under the action of the spring 117, the detent is supported to hold said clutch pin retracted, but forward movement of said lever 120, acts to throw the crank arm 113, upwardly to actuate said lever 114, to release the detent from retaining position permitting the clutch pin to engage in the gear to thereby drive the apron.

Supported on the side frame members 8 are upwardly extending brackets 121, on each side the frame and each provided at the top with forwardly and rearwardly extending arms 122 and 123. Journaled in the rearwardly extending arms 123, is a shaft 124, which, as shown, is angular between its bearings for its entire length, and slidably secured on which, in alinement with the space between alternate pairs of cutters, are adjustable complemental sleeves 125, from which extends a central rearwardly directed hub 126, through which extends a transverse rod 127, having guide plates 128, secured on each end thereof to direct the severed cards into the pack as they are collected therebetween. Secured in said hub is a rearwardly directed rod 129, having a stop plate 130, adjustably secured on the outer end thereof and which normally (as well as the guide plates 128) rests upon the upper surface of the apron or carrier 99, as shown in Fig. 7. Journaled transversely the machine at the rear end of the fingers 131, on the bars 31, which project between the shafts 15 and 16, is a shaft 132. This is driven continuously by means of the sprocket chain 133, trained about a sprocket wheel 134, secured on the shaft 59, and which also is trained about a sprocket wheel 135, secured on said shaft 132.

Rigidly secured on the under side of alternate pairs of fingers 131, are rearwardly extending brackets 136, forked at their rear ends and having journaled therebetween rollers or pulleys 137. A belt or carrier 138, is trained about the shaft 132, and said rollers or pulleys 137, are directed in alinement between said guide plates 128, for the rear packs of cards to deliver alternate cards from each strip, as severed by the rotating cutters, to said packs.

Secured in suitable brackets 139, on each side the frame, is a shaft 140, having secured thereon above each each of said rearwardly directed brackets 136, a collar 141, having an upwardly directed arm 142, and a downwardly directed arm 143. Pivotally engaged on the downwardly directed arm, is a rearwardly directed yoke 144, in which is journaled an idle roller 145, adapted to engage the advance edges of the card on said carrier by gravity and to feed the same rearwardly thereby, and pivotally engaged on the upper arm 142, on said collar, is a rearwardly and downwardly directed rod 146, provided with a yoke 147, at its rear end, in which is journaled a roller 148, which coacts with the rear pulley or roller 137, in said carrier to feed the cards from the carrier onto the rear packs X. Journaled transversely the frame near the rear end of said fingers 131, and above the same, is an angular shaft 149, similar to the shaft 124, before described, and having likewise secured thereon complemental sleeves 150, each provided with its rearwardly directed hub 151, from which extends a rearwardly directed rod 152, having adjustably secured thereon a downwardly directed stop plate 153, for the inner packs $y$, or those alternate with the outer packs $x$. Said shafts are normally adjusted, as shown in Fig. 7, with the stop plates bearing upon the upper surface of the carrier or apron belt 99, and means are provided for elevating said stop plates simultaneously with the drive of the belt or carrier to the table 102. For this purpose, a geared segment 154—155, is provided on each of said shafts 124 and 149, and these are directed inwardly toward each other, and meshing with each of the said geared segments, is a mutilated gear comprising a bar 156, journaled centrally on the upper end of said bracket 121, and provided with geared teeth at each end thereof, which mesh with the teeth on said mutilated gear segments. The shaft 157, on which said mutilated gear 156, is secured, extends through said bracket 121, and rigidly secured thereon is a downwardly directed link 158, and secured to the lower end of which is a connecting rod 159, as shown in Fig. 2, the other end of which is secured to the operating lever 120, above the pivot therefor, so that when said lever is thrown rearwardly to release the detent 109, from the clutch pin 107, thereby starting the drive of the apron, the mutilated gear is actuated, as shown in Fig. 8, and simultaneously elevates the stops for all the card packs assembled on the carrier 99. When the packs have cleared said stops, the lever 120, is returned to normal, thereby returning the previously actuated mechanisms to normal to continue.

The operation is as follows: The machine is, of course, first adjusted to cut the cards of the desired size. For this purpose, the hand wheel 74, is rotated to release the cams 73, from the adjusting racks 68, for the knife gage 75, and the hand wheel 71, is rotated until the indicator 86, reaches a point on the scale 85, for the required length of the cards. The cams are then again set up to engage the racks in adjusted position.

The rotative cutters are next adjusted for the required width of the cards. This is accomplished by releasing the set screws 18 and 20, for the respective cutters and adjusting the cutters the required distance apart and also adjusting the bars 31, on the frame bar 29, as before described. The adjustment of said frame bars and cutters also adjusts the carriers 138, for the outer packs. The respective guides and top plates are now adjusted by the sliding sleeves 125—150, to suitable positions on the angular shafts 124 and 149, and these may be rigidly secured in place by means of suitable set screws, if desired. The operating lever is adjusted, as shown in Fig. 2, that is to say, the detent 107, is elevated to release the gear 105, from the clutch pin and simultaneously with this adjustment as before described, the mutilated gear 156, is rocked to horizontal position, as shown in Fig. 7, thereby bringing the stops for the respective packs into operative position. If it is desired to assemble the cut cards in packs of one hundred, the operator may cut the card sheets of a length so that each card sheet will furnish a number of card strips, that is, a divisor of the number of cards to be contained in each pack. For example, card sheets may be used of a length to afford ten card strips, in which event the operator knows that when ten of said card sheets have been fed through the machine, there must of necessity be one hundred in each pack, and thereupon the operator releases the clutch pin and elevates the stops by actuating the operating lever 120, and immediately after the discharge of the collected cards beneath the same, returns the same to normal for the next pack to be collected. As the reciprocating knife severs the sheet into card strips of the appropriate dimension to afford the strip from which the required cards are to be cut, each downward reciprocation of the knife brings the presser bar 54, down upon the sheet to firmly hold the same until the cut is completed. The operator each time feeds the card sheet inwardly until arrested by the upwardly directed web 76 of the gage bar 75, and simultaneously with the retraction of the knife, the rotation of the sprocket wheel 61, trips the gage bar, as shown in Fig. 18, permitting the card strip to drop upon the bars 31. Simultaneously with the fall of the card strip, the feed bars 89, are actuated rearwardly by their cranks 91, and passing between the bars 31, deliver the card strip to the rotative knives. Inasmuch as the series of bars 89, extend for nearly the entire width of the table, the card strip is thereby adjusted accurately to the rotative cutters. With the retraction of the bars 89, preliminary to the next forward movement, a card strip, should it have fallen thereon, will be drawn forwardly until engaged by the downwardly directed fingers 98, which serve to arrest the same and adjust the card strips square with the machine so that when the next forward movement of the feed bars 89, begins, such alinement is maintained. As the cards are severed by the rotative cutters, the rearwardly extending ends of alternate cards are fed over the shaft 132, and thereby projected against the inner stops 153, to afford the inner packs y. The remaining cards, formed from the strip are engaged at their rear ends by the roller 145, on the continuously driving carrier belt 138, and thereby delivered beneath the roller 148, and on the rear extremity of the arm 146, and thence are projected against the rear stop plates 130, to afford the rear packs. For this purpose, the guide plates 128, serve to adjust the cards in said pack relatively each other in forming the pack. When the required number of sheets have been cut to afford the desired number in each pack, the stops are elevated as before described, and the packs are delivered from collecting position and the operation is repeated indefinitely.

An important feature of my invention consists in so mounting both the reciprocating and rotating knives as to render the same in effect, self-sharpening. For this purpose the spring 35, in the rear bracket 33, and the spring 39, at the pivot bearing for the knife bar 36, permit said knife bar to yield slightly toward the rear, should any selvage or portion of the cardboard lodge between the moving knife and the fixed knife, and also insures the moving knife serving true to the fixed knife to obtain the best cutting effect. In a similar manner, the rotative knives 25, on the shaft 15, are yieldingly held in cutting relation against the knives 19, for the lower shaft and in consequence, although sufficient pressure is always maintained to afford the best cutting relation and coöperation of the knives, such yielding acts to prevent any crumbling or turning of the edge of the knife due to any abnormal resistance, should it be encountered. In practice, I have found that a sharp edge is maintained on such knives indefinitely when so mounted.

Of course, as the cards are delivered to the table 102, the packs are inspected, banded, and said table may serve as the packing table, if desired, or the packs may be delivered mechanically or otherwise to any desired point for packing.

Of course, I am aware that features of the details of construction may be varied in many particulars and that various devices of an equivalent nature may be substituted for the particular mechanisms herein shown. I have, however, shown but one, (and that the preferred) form for embodying my invention, and whereby cards may be cut to size at high speed and with the utmost accuracy from standard commercial sheets of board. I therefore do not purpose limiting the patent to be granted on this application otherwise than necessitated by the prior art.

I claim as my invention:

1. A machine of the class described embracing mechanism for severing the sheets into strips of uniform width, coacting cutters acting to simultaneously sever said strips transversely into a plurality of cards, mechanism for advancing a plurality of said cards out of alinement with the remaining cards and means assembling said cards into a plurality of packs.

2. A machine of the class described embracing a transverse cutter for severing a card sheet into strips of card length, a gage for measuring and supporting said strips as they are being cut from the sheet, means adapted to swing said supporting and measuring gage to release the strip after the strip has been cut from the sheet, cutters acting to sever said strips successively each into a plurality of cards, and means assembling said cards as severed, simultaneously into a plurality of packs.

3. A machine of the class described embracing a transverse cutter acting the entire width of a sheet, a gage for the strips to be severed, coacting cutters acting to sever said strips simultaneously into a plurality of cards of uniform dimensions, means advancing the strip to said cutters, and means assembling said cards from each strip when cut simultaneously into a plurality of packs, alternate packs in advance of the intermediate packs.

4. A machine of the class described embracing a transverse cutter for cutting a sheet into strips having a width equal to one dimension of the required cards and coacting cutters acting to sever said strips successively to afford from each simultaneously a plurality of cards, and means advancing alternate cards into packs.

5. In a machine of the class described a knife, for severing a sheet of the material into strips, having one of the dimensions of the product, a gage for measuring and supporting said strips as they are being cut from the sheet, means adapted to swing said gage rearwardly to release each strip after it has been cut from the sheet cutters acting to simultaneously sever each strip into a plurality of pieces having the other dimension of the product, and means for assembling the severed pieces into individual packs of a predetermined number.

6. In a machine of the class described a transversely reciprocating knife for severing a sheet of the material into strips having one of the dimensions of the product, rotative coacting cutters acting to simultaneously sever the strip into pieces having the other dimension of the product, means for advancing alternate pieces beyond the intermediate pieces and assembling the severed pieces into individual packs, and a carrier apron for moving said packs from the machine.

7. A machine of the class described embracing a transversely arranged, spring pressed cutter for severing a sheet of the material into strips, of a width equal to one dimension of the product, an automatically releasing gage, for the strips, rotative adjustable cutters acting simultaneously to sever the strips into pieces having the other dimension of the product, belt carriers for advancing alternate pieces, and mechanism for assembling the product in packs arranged in two lines transversely the machine.

8. In a machine of the class described a reciprocating knife acting to sever a sheet of the material into transverse strips having one of the dimensions of the product, rotative adjustable cutters acting to simultaneously sever the strip into equal pieces having the other dimension of the product, alternately arranged upper and lower assembling means for assembling the corresponding pieces severed into successive strips into individual packs, and means discharging the packs from the machine.

9. A machine of the class described embracing a transversely arranged cutter for severing a sheet of the material into strips of a width equal to one dimension of the product, rotative adjustable spring pressed cutters acting simultaneously to sever the strips into pieces having a dimension equal to the other dimension of the product, alternately arranged upper and lower carriers for advancing the pieces with alternate pieces in advance, and mechanism for assembling the product in packs arranged in two lines transversely the machine.

10. In a machine of the class described mechanism for severing a sheet of the material into strips having one of the dimensions of the product, rotative coacting cutters acting to simultaneously sever each strip into pieces having the other dimension of the product, a conveyer acting to move alternate pieces in advance of the intermediate pieces, mechanisms for assembling the severed pieces into individual packs of a predetermined number, and means discharging the packs when the number is complete.

11. A machine of the class described embracing a transversely arranged spring pressed reciprocating cutter for severing a sheet of the material into strips of a width equal to the length of the product, an automatic gage for the strips, adjustable spring pressed rotative cutters arranged in coacting pairs and acting simultaneously to sever the strips into pieces having the width of the product, means advancing alternate pieces, and mechanism for assembling the product in packs of a predetermined number of pieces arranged in two lines transversely the machine.

12. A machine of the class described embracing a transversely arranged reciprocating knife for severing a sheet of the material into strips of a width equal to the length of the product, an automatic gage for measuring and supporting said strips as they are being cut from the sheet, an automatic presser foot carried on the knife for holding the material, means adapted to swing said gage rearwardly after the strip has been cut from the sheet, coacting cutters acting simultaneously to sever the strips into pieces having the width of the product, mechanism for assembling the product in individual packs, and a carrier for discharging the same from the machine.

13. In a machine of the class described a feed table, a reciprocating knife acting thereon to sever the sheets of material into strips of a width corresponding with one dimension of the product, an equalizing presser foot carried thereon, a plurality of pairs of rotative adjustable cutters, mechanism adjusting and feeding the severed strips thereto, and mechanisms acting to receive the severed pieces from said rotative knives and to advance alternate pieces out of alinement with the remaining pieces.

14. In a machine of the class described a feed table, a transverse reciprocating knife acting thereon to sever the sheet of material into strips of a width corresponding with one dimension of the product, an automatic presser foot movable therewith, a plurality of pairs of rotative adjustable cutters, reciprocating mechanism adjusting and feeding the severed strips thereto, and mechanism acting to receive the severed pieces from said rotative knives and to advance alternate pieces out of alinement with the remaining pieces.

15. In a machine of the class described a feed table, a transverse reciprocating knife acting thereon to sever the sheets of material into strips of a width corresponding with one dimension of the product, a gage for determining the width of the strip, an automatic presser foot movable with the knife, a plurality of pairs of rotative adjustable cutters, mechanism for adjusting and feeding the severed strips thereto, and individual belt carriers acting to receive the severed pieces from said rotative knives and to advance alternate pieces out of alinement with the remaining pieces.

16. In a card cutting machine a reciprocating knife for cutting the sheets of cardboard into strips of a width equal to the length of the cards, adjustable rotative cutters to sever the strip into pieces of a width equal to the other dimension of the cards, mechanism for feeding the severed strip to said rotative cutters, carriers arranged between alternate pairs of cutters to advance alternate pieces faster than the remaining pieces, means for collecting said pieces or cards in packs, and mechanism for delivering the packs therefrom to a place of disposal.

17. In a card cutting machine a reciprocating knife for cutting the sheet of cardboard into strips of a width equal to the length of the cards, an automatic gage for the strips, a spring pressed presser foot, adjustable rotative cutters to sever the strip into pieces having the other dimension of the cards, mechanism for feeding the strip to said rotative cutters, carriers arranged between alternate pairs of cutters to advance alternate pieces faster than the remaining pieces, means for collecting said pieces or cards in packs, and mechanism for delivering the packs therefrom to a place of disposal.

18. In a machine of the class described means for severing a sheet of material into strips, comprising a rigid knife, a feed table approximately on a level with the top of the fixed knife, longitudinally adjustable standards at the rear of said knives, a gage pivotally supported on said standards and adapted to measure and support the material to be cut into strips and means adapted to swing said gage rearwardly to permit the displacement of the strips therefrom after they have been cut from the sheet.

19. In a device of the class described rotative coacting cutters arranged in pairs adapted to sever a strip into a plurality of cards, a transverse frame member, longitudinal carrying bars adjustably secured to said member, fingers on each of said bars adapted to extend on each side of one of the pairs of cutters to support the strips while passing therethrough, a transverse bar slidably supported in advance of the rotative cutters, rearwardly projecting feed bars adjustably secured to said bar, an extension on each of said bars adapted to project above the surface of the carrying bars, means for reciprocating said feed bars between the carrying bars to feed the strips upon the same to the rotative cutters and means adapted to prevent the strips from being drawn forwardly with the retraction thereof.

20. A machine of the class described embracing a feed table, a gage adapted to measure and support the material to be cut into strips, a transversely arranged reciprocating knife acting to sever the material into strips, means adapted to actuate said gage to permit the cut material to be displaced therefrom, a spring supported presser foot thereon, and springs acting to yieldingly hold said knife in cutting position.

21. In a machine of the class described means for severing a sheet of material into strips, comprising a rigid knife and a reciprocating knife, a gage supported on said standards and adapted to measure and support the material to be cut into strips and means adapted to swing said gage rearwardly to permit the displacement of the strips therefrom after they have been cut from the sheet.

22. In a machine of the class described a feed table, a stationary knife arranged transversely the same, a reciprocating knife to coact therewith to sever the sheet into strips, a gage for determining the width of the strip, and mechanism for releasing the gage from the strip simultaneously with the retraction of the knife.

23. In a machine of the class described a feed table, a stationary knife arranged transversely the same, a reciprocating knife to coact therewith to sever the sheet into strips, a gage for determining the width of the strip, mechanism for releasing the gage from the strip simultaneously with the retraction of the knife, and an equalizing presser foot yieldingly carried on the knife.

24. In a machine of the class described a feed table, a stationary knife arranged transversely the same, a reciprocating knife, springs holding the same yieldingly to coact with the stationary knife to sever the sheet into strips, an automatic gage for determining the width of the strip, mechanism for releasing the gage from the strip simultaneously with the retraction of the knife, and a spring pressed presser foot movable with the knife.

25. In a machine of the class described a feed table, a stationary knife arranged transversely the same, a reciprocating knife yieldingly held to coact therewith to sever the sheet into strips, a gage for determining the width of the strip, mechanism for releasing the gage from the strip simultaneously with the retraction of the knife, and means advancing the strip.

26. A machine of the class described embracing a table, a fixed knife arranged transversely thereof, a reciprocating spring pressed knife coacting therewith, a gage determining the width of the strip, mechanism for releasing the gage from the strip with the retraction of the knife, mechanism for cutting the strip transversely into equal pieces, and reciprocating means for feeding the strip to said knives.

27. A machine of the class described embracing a table, a fixed knife arranged transversely thereof, a reciprocating spring pressed knife coacting therewith, a gage determining the width of the strip, mechanism for releasing the gage from the strip with the retraction of the knife, mechanism for cutting the strip transversely into equal pieces, and reciprocating means for adjusting and feeding the strip to said knives.

28. A machine of the class described embracing a table, a fixed knife arranged transversely thereof, a reciprocating spring pressed knife coacting therewith, a gage determining the width of the strip, mechanism for releasing the gage from the strip with the retraction of the knife, mechanism for cutting the strip transversely into equal pieces, reciprocating means for adjusting and feeding the strip to said knives and acting to first draw the strip from, and then advancing the same to the last named cutters.

29. In a machine of the class described, means for cutting a sheet of material into a plurality of strips, rotative coacting cutters arranged in pairs for severing each strip into a plurality of cards, a transverse frame member, longitudinal carrying bars adjustably secured to said member and fingers on each of said bars adapted to extend on each side of one of the pairs of cutters to support the strips while passing therethrough.

30. In a machine of the class described the combination with the cutters for severing a card strip into cards of the required width, of mechanism for advancing alternate severed pieces out of alinement with the remaining pieces.

31. In a machine of the class described the combination with the cutters for severing a card strip into cards of the required width, of mechanism for advancing alternate severed pieces out of alinement with the remaining pieces, and assembling corresponding cards of successive strips into packs.

32. In a machine of the class described the combination with the cutters for severing a card strip into cards of the required width, of mechanism for advancing alternate severed pieces out of alinement with the remaining pieces, and collecting the cards into a plurality of packs.

33. In a machine of the class described the combination with the cutters for severing a card strip into cards of the required width, of mechanism for advancing alternate severed pieces out of alinement with, and beyond the remaining pieces, and means adjusting said mechanism for various widths of cards.

34. In a machine of the class described the combination with mechanism for severing the card strip simultaneously into a plurality of cards, of a carrier for alternate cards acting to deliver the same as severed into packs, beyond the point of delivery for the remaining cards, and a release mechanism acting to advance the packs when formed.

35. In a machine of the class described the combination with mechanism for severing the card strip simultaneously into a plurality of cards, of a carrier for alternate cards acting to deliver the same as severed into packs beyond the point of delivery for the remaining cards, means guiding the cards into packs, and a release mechanism acting to advance the packs when formed.

36. In a machine of the class described the combination with adjustable spring pressed knives for severing the card strip simultaneously into a plurality of cards, of elevated carriers for alternate cards acting to deliver the same as severed into packs beyond the point of delivery for the remaining cards, and a release mechanism acting to advance the packs when formed.

37. In a machine of the class described the combination with adjustable coacting knives arranged in pairs for severing the card strip simultaneously into a plurality of cards, of elevated carriers for alternate cards acting to deliver the same as severed into packs, beyond the point of delivery for the remaining cards, means adjusting the carriers for various sizes of cards, and a release mechanism acting to advance the packs when formed.

38. A collecting and packaging mechanism for a machine of the class described, comprising carriers for alternate cards acting to advance the same beyond the remaining cards and alternately arranged forward and rear adjustable stops acting to collect all the cards in front and rear alternately arranged packs, a carrier upon which the packs are supported, and mechanism for actuating the carrier and simultaneously releasing the stops.

39. A collecting and packaging mechanism for a machine of the class described, comprising elevated carriers for alternate cards acting to advance the same beyond the remaining cards, alternately arranged forward and rear adjustable stops acting to collect all the cards in front and rear alternately arranged packs, a main carrier upon which the packs are supported, and mechanism for actuating the carrier and simultaneously releasing the stops.

40. A collecting and packaging mechanism for a machine of the class described, comprising elevated belt carriers for alternate cards acting to advance the same beyond the remaining cards and alternately arranged forward and rear adjustable stops acting to collect all the cards in front and rear alternately arranged packs, a main carrier upon which the packs are supported, mechanism for actuating the carrier and simultaneously releasing the stops, and means adjusting the elevated carriers.

41. In a machine of the class described a reciprocating knife for severing a sheet of material into strips, a feed table, a longitudinally adjustable gage pivotally supported at the rear of said knife and adapted to measure and support the material to be cut into strips, and means adapted to actuate said gage to permit the displacement of the strips therefrom after they have been cut from the sheet.

42. In a device of the class described means for cutting sheets of material into a plurality of strips, rotative cutters arranged in pairs for severing each strip into a plurality of cards, a transverse frame member, longitudinal carrying bars adjustably secured to said member, fingers on each of said bars adapted to extend on each side of one of the pairs of cutters to support the strips while passing therethrough, a transverse bar slidably supported in advance of the rotative cutters, rearwardly projecting feed bars adjustably secured to said bar, an extension on each of said bars adapted to project above the surface of the carrying bars to bear against the edge of the strips to be fed, and means for reciprocating said feed bars between the carrying bars to feed the strips upon the same to the rotative cutters.

43. A machine of the class described embracing a frame, means for severing a sheet of material into strips, a longitudinally adjustable gage at the rear of said means and adapted to aline, measure, and support the material to be cut into strips and means adapted to actuate said gage to permit the displacement of the strips therefrom after they have been cut from the sheet.

44. In a device of the class described cutters arranged in pairs for severing a strip into a plurality of cards, longitudinal carrying bars, a bar slidably supported upon in advance of said cutters, feed bars adjustably secured to said bar, and means for reciprocating said feed bars between the carrying bars to feed the strips upon the same to the rotative cutters.

45. A machine of the class described embracing a frame, means for severing a sheet of material into strips, longitudinally adjustable standards at the rear of said means, a gage pivotally supported on said standards and adapted to aline, measure and support the material to be cut into strips, means adapted to swing said gage to permit the displacment of the strips therefrom after they have been cut from the sheet, rotative cutters arranged in pairs for severing each strip into a plurality of cards, longitudinal carrying bars, fingers on each of said bars adapted to extend on each side of one of the pairs of cutters, a bar slidably supported upon said frame, feed bars adjustably secured on said bar, means for reciprocating said feed bars between the carrying bars to feed the strips upon the same to the rotative cutters and means adapted to prevent the strips from being drawn forwardly with the retraction thereof.

46. A machine of the class described embracing a frame, means for severing a sheet of material into strips, a longitudinally adjustable gage pivotally supported at the rear of said means, and adapted to aline and support the material to be cut into strips, means adapted to actuate said gage to permit the displacement of the strips therefrom after they have been cut from the sheet, rotative cutters arranged in pairs for severing each strip into a plurality of cards, carrying bars, fingers on each of said bars adapted to extend on each side of one of the pairs of cutters, feed bars in advance of said cutters, an extension on each of said bars adapted to bear against the edge of the strip to be fed to the cutters, and means for reciprocating said feed bars between the carrying bars to feed the strips upon the same to the rotative cutters and means adapted to prevent the strips from being drawn forwardly with the retraction thereof.

47. In a machine of the class described, means for severing a sheet of material into strips, longitudinally adjustable means at the rear of said standards adapted to aline and support the material to be cut into strips, means adapted to swing said alining and supporting means rearwardly to permit the displacement of the strips therefrom after they have been cut from the sheet, cutters arranged for severing each strip into a plurality of cards, a frame member, carrying bars secured thereto, fingers on each of said bars adapted to extend on each side of one of the cutters to support the strips while passing therethrough, a slidable bar supported in advance of the cutters upon said frame and beneath the feed table, feed bars adjustably secured to said bar, means for reciprocating said feed bars between the carrying bars to feed the strips upon the same to the cutters and means adapted to prevent the strips from being drawn forwardly with the retraction of the feed bars.

48. A machine of the class described embracing a frame, means for severing a sheet of material into strips, a gage adapted to aline and support the material to be cut into strips, means adapted to actuate said gage to permit the displacement of the strips therefrom after they have been cut from the sheet, cutters arranged in pairs for severing each strip into a plurality of cards, a frame member, members on each of said bars adapted to extend on each side of one of the pairs of cutters to support the strips while passing therethrough, a bar slidably supported upon said frame, feed bars on said bar, means for reciprocating said feed bars between the carrying bars to feed the strips upon the same to the cutters and means adapted to prevent the strips from being drawn forwardly with the retraction of the feed bars.

49. A machine of the class described embracing a frame, means for severing a sheet of material into strips, a longitudinally adjustable gage pivotally supported at the rear of said means and adapted to aline and support the material to be cut into strips, means adapted to actuate said gage to permit the displacement of the strips therefrom after they have been cut from the sheet, cutters arranged in pairs for severing each strip into a plurality of cards, a frame member, carrying bars, a bar slidably supported upon said frame, feed bars secured on said bar, an extension on each of said bars adapted to project above the surface of the carrying bars and against the edge of the strip to be fed, means for reciprocating said feed bars between the carrying bars to feed the strips upon the same to the rotative cutters and means assembling said cards from each strip into a plurality of packs, alternate packs in advance of the intermediate packs.

50. A machine of the class described embracing a frame, means for severing a sheet of material into strips, a gage adapted to aline and support the material to be cut into strips during the cutting operation, cutters for severing each strip into a plurality of cards, a frame member, carrying bars on said member, fingers on each of said bars adapted to extend on each side of the cutters to support the strips while passing therethrough, a bar slidably supported upon said frame, feed bars adjustably secured to said bar, an extension on each of said bars adapted to project above the surface of the carrying bars to bear against the edge of the strip to be fed, means for reciprocating said feed bars between the carrying bars to feed the strips upon the same to the rotative cutters and means adapted to prevent the strips from being drawn forwardly with the retraction of the feed bars, means for advancing alternate cards beyond the intermediate cards and assembling the same into individual packs.

51. In a machine of the class described means for severing a sheet of material into strips, cutters for severing each strip into a plurality of cards, a frame member, carrying bars secured to said member, a slidable bar supported in advance of said cutters, rearwardly projecting feed bars secured to said bar, an extension on each of said bars adapted to project above the surface of the carrying bars and bear against the edge of the strip to be fed, means for reciprocating said feed bars between the carrying bars to feed the strip upon the same to the rotative cutters and means adapted to prevent the strips from being drawn forwardly with the retraction of said feed bars.

52. In a machine of the class described means for severing a sheet of material into strips, a longitudinally adjustable gage supported at the rear of said means and adapted to aline and support the material to be cut into strips during the cutting operation, cutters for severing each strip into a plurality of cards, a frame member, carrying bars adjustably secured to said member, fingers on each of said bars adapted to extend on each side of the cutters to support the strips while passing therethrough, a bar slidably supported in advance of said cutters, feed bars on said bar, means for reciprocating said feed bars between the carrying bars to feed the strips upon the same to the rotative cutters and means adapted to prevent the strips from being drawn forwardly with the retraction of said feed bars, means for advancing alternate cards beyond the intermediate pieces and assembling the severed cards into individual packs, and a carrier apron for moving said packs from the machine.

In testimony whereof I have hereunto subscribed my name in the presence of two subscribing witnesses.

GEORGE C. BAUMAN.

Witnesses:
C. W. HILLS,
CHARLES W. HILLS, Jr.